Aug. 29, 1933.  S. KERSTEN  1,924,942
WATER FAUCET
Original Filed May 12, 1930
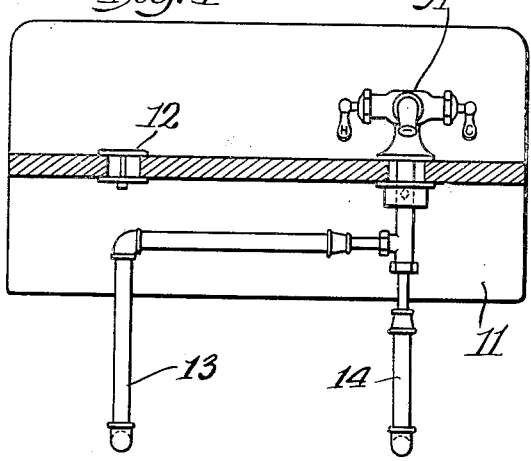
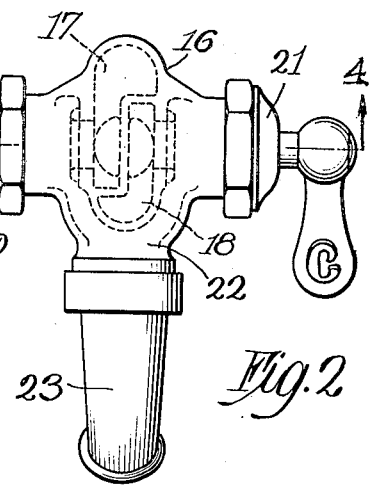
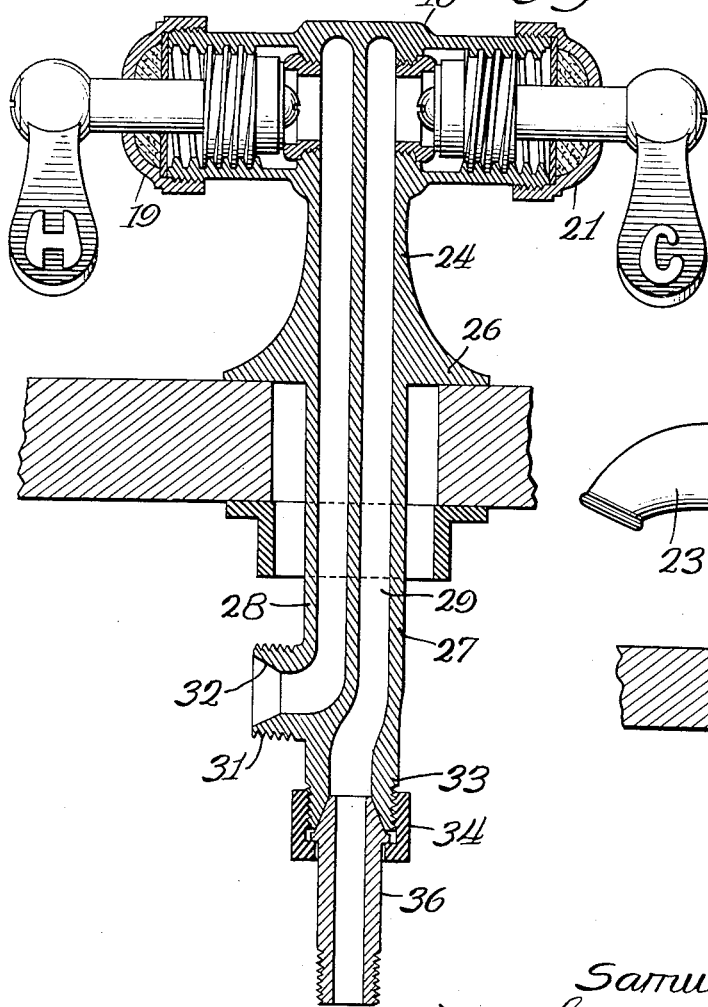
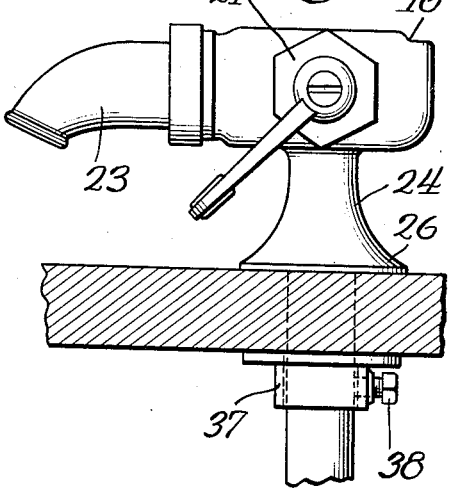
Inventor
Samuel Kersten
By George E. Mueller
Atty.

Patented Aug. 29, 1933

1,924,942

UNITED STATES PATENT OFFICE 1,924,942

WATER FAUCET

Samuel Kersten, Chicago, Ill.

Original application May 12, 1930, Serial No. 451,563. Divided and this application February 24, 1932. Serial No. 594,926

1 Claim. (Cl. 277—57)

My invention relates in general to water faucets, and more in particular to hot and cold water mixing faucets adapted for lavatory use. The invention also contemplates the use with such a faucet of improved water control features and water discharge features as will be pointed out. This application is a division of my copending application Serial No. 451,563, filed May 12, 1930, now Patent Number 1,854,796.

While the features of my invention are adapted for use in many ways, I shall describe them in connection with the usual lavatory or wash bowl.

Until somewhat recently it has been customary to use separate hot and cold water faucets on most lavatory basins, at least for home use, the user of the basin filling the same from the two faucets with water having a proper temperature for washing. Rather recently a demand has been made for combination faucets, in which the basin would not be filled with water unless desired by the user, who could adjust a single stream of water to have a satisfactory temperature for washing, and then wash in the running stream. The combination faucets employed for this purpose are often mounted on old style basins, wherein two vertical openings are provided, one opening being plugged up, and the other opening accommodating the combination faucet. This faucet had to be designed to have a neat appearance so that nothing but the faucet proper would project above the basin, all the connections being made underneath the basin. These connections were made with a T of special design, wherein each stream of water was taken up separately through a single pipe and delivered to the two valves, the mixing of the two streams of water taking place after the water passed the valve. This construction is unsatisfactory in many respects. Since the faucet has to pass through a relatively small opening in the basin, the T connection had to be made separate, and was necessarily so constructed that leaks readily occurred at the point of connection. Moreover, due to the possiblity of turning the faucet itself, thus causing additional relative movement between the faucet and its connection, causing leaks, means had to be provided for securely fastening the faucet to the basin. All of this necessitated the use of costly construction, which was still unsatisfactory in some respects. Moreover, due to the arrangement of the connections, the installation of this type of faucet took a long time and was unnecessarily expensive.

One of the principal objects of my present invention is to provide an improved faucet which will overcome all of the difficulties pointed out.

Another object is the provision of a faucet in which fully satisfactory mixing of hot and cold water takes place.

Another object is the provision of an improved water saving feature adapted for use with this type of faucet.

Other objects and features of the invention will be apparent from a consideration of the following detailed description taken with the accompanying drawing, wherein, Fig. 1 shows the manner in which my faucet is connected, Fig. 2 is a plan view of the faucet proper, Fig. 3 is a side elevation view thereof, and Fig. 4 is a vertical sectional view taken along the line 4—4 of Fig. 2.

In Fig. 1 I show a usual form of wash basin 11, with my faucet A attached thereto through one of the usual faucet openings, the other opening being covered with a suitable plug 12. Underneath the basin pipes 13 and 14 are shown which project from the wall of the room, in standard construction these pipes being approximately 12 inches apart, measuring from center to center. These pipes are adapted to be easily and readily connected to my improved faucet as Fig. 1 illustrates, but the details of this connection will be pointed out in connection with the explanation of the faucet.

The faucet proper includes a body 16, with hot and cold water chambers 17 and 18 respectively, disposed side by side, and valve mechanism 19 and 21 for controlling the flow of hot and cold water from such chambers to a mixing chamber 22, to which a spout 23 is connected, the spout serving as a common discharge opening for the hot and cold water. The valve body is supported on an upright 24, which has a flange 26 adapted to rest on top of the basin. An extension 27 of the valve projects down through the basin opening and continuous passageways 28 and 29 disposed side by side in the extension connect directly with the chambers 17 and 18. In effect therefor, the upright 24, together with the extension 27, serve as a common extension of the faucet proper, since the two chambers 17 and 18 in the faucet connect directly with the continuous passageways 28 and 29, and are integral therewith.

The usual hot and cold water pipes are connected directly to the faucet extension. They are so disposed that the pipes are at a substantial angle to each other, to prevent tendency of the faucet to turn, after it has been mounted in position. More specifically, in the embodiment shown, a threaded boss 31 provided on one side of the extension has the opening 29 extending at right angles through the center thereof. Inside this boss a ground seat 32 is provided, adapted to receive a tapered ground cone of standard design as shown in connection with the cold water opening. Referring to this opening the passageway 29 is offset below the hot water opening so as to be substantially directly in line with the axis of the extension. Threads 33 are provided for receiving a nut 34 used to hold a connecting pipe 36 in position, a ground connection being provided between this pipe and the faucet extension opening so that no washers are required. This is a standard type of construction, and the nut 34 and pipe 36 are of standard type.

As Fig. 1 shows, in standard constructions the hot and cold water pipes leading to lavatory basins, extend through the wall of a room 12 inches apart from center to center, and are then brought vertically upward to be directly in line with the openings in the lavatory basin. In conventional constructions employing two faucets, one on each side, these pipes extend up and connect with the faucets, and are so arranged that when brought up they are directly in line and will connect with the faucets without difficulty. Now when employing my present hot and cold water combination faucet, the cold water pipe is used in exactly the same way, the connection thereto being directly in line. Then, to connect the hot water pipe to the faucet it is simply necessary to run a pipe directly over from the usual hot water pipe and the connection is very quickly and easily made. Besides this, with the two pipes connected in this manner any tendency of the valve to turn is prevented. This is absolutely necessary of course, or the plumbing fittings would soon become so loose as to cause leaking around the joints.

In installing the faucet of my invention all that is necessary is simply to drop the faucet extension down through the opening in the basin, the dimensions being such that the extension will pass readily through the ordinary standard opening. Then, to prevent the faucet from being displaced, an oval collar 37 is placed over the extension and a set screw 38 employed, tightening it up to engage the extension. The faucet having the flange 26 on top of the basin and the collar 37 below the basin will be held in a stationary position. The arrangement of the pipe fittings makes it unnecessary to provide threaded lock nuts or other locking means which require the use of costly exterior threads on the faucet extension.

While I have described the details of my invention to make the same clear to those skilled in the art, it is obvious that other details and embodiments may be used without departing from the invention as defined in the appended claim.

What I claim is new and desire to protect by Letters Patent of the United States is:—

A combination faucet adapted for use on the usual lavatory basin, said faucet including a faucet body having hot and cold water chambers disposed adjacent each other, a common spout, valve mechanism for controlling flow of hot and cold water to such spout, a downward integral extension of said body having hot and cold water passageways communicating directly with said valve chambers, a flange on said extension adapted to rest on top of the basin, the lower part of the extension projecting downwardly through the usual faucet opening, a threaded boss on one side of said extension near the end thereof for attachment of a pipe for supplying water to one passageway in said extension, and a central downwardly projecting threaded boss for attachment of a pipe for supplying water to the other of said passageways.

SAMUEL KERSTEN.